United States Patent
Dean

(10) Patent No.: US 7,140,625 B2
(45) Date of Patent: Nov. 28, 2006

(54) RECONFIGURABLE STRUT ASSEMBLY

(75) Inventor: Simon Dean, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 317 days.

(21) Appl. No.: 10/680,685

(22) Filed: Oct. 7, 2003

(65) Prior Publication Data

US 2004/0145145 A1    Jul. 29, 2004

Related U.S. Application Data

(63) Continuation-in-part of application No. 10/349,726, filed on Jan. 23, 2003, now Pat. No. 6,997,467.

(51) Int. Cl.
*B60G 15/00* (2006.01)
(52) U.S. Cl. .................... 280/124.146; 280/93.512
(58) Field of Classification Search ........... 280/93.512, 280/93.511, 124.145, 124.146
See application file for complete search history.

(56) References Cited

U.S. PATENT DOCUMENTS

| | | | | |
|---|---|---|---|---|
| 5,366,233 A | * | 11/1994 | Kozyra et al. | 280/93.512 |
| 5,782,484 A | * | 7/1998 | Kuhn, Jr. | 280/124.142 |
| 5,938,219 A | * | 8/1999 | Hayami et al. | 280/124.135 |
| 6,343,804 B1 | * | 2/2002 | Handke et al. | 280/124.145 |
| 6,367,830 B1 | * | 4/2002 | Annequin et al. | 280/93.512 |
| 6,883,816 B1 | * | 4/2005 | Baker et al. | 280/93.512 |

FOREIGN PATENT DOCUMENTS

EP    1 043 212 A2    10/2000

* cited by examiner

*Primary Examiner*—David R. Dunn
*Assistant Examiner*—Drew J. Brown
(74) *Attorney, Agent, or Firm*—Carlson, Gaskey & Olds

(57) ABSTRACT

A vehicle includes front and rear suspension systems. The vehicle includes front left and right strut assemblies respectively including front left and right knuckles. Rear left and right strut assemblies respectively include rear left and right knuckles. The knuckles are common with one another with each knuckle having a common lower suspension attachment boss. The front left and right knuckles respectively receive front left and right connection members at the lower attachment boss. The connection members are respectively interconnected to the front left and right suspension components. The rear left and right knuckles respectively receive rear left and right connection members at the lower attachment boss respectively interconnected to rear left and right suspension components. The overall suspension for the vehicle is designed by determining the knuckle position parameters for one of the knuckles including such features as suspension member, brake, and wheel assembly attachment points. Similarly, the knuckle position parameters are determined for another knuckle in a different location or on a different vehicle. Common vehicle attachment points on the knuckles are then calculated for the vehicle.

8 Claims, 3 Drawing Sheets

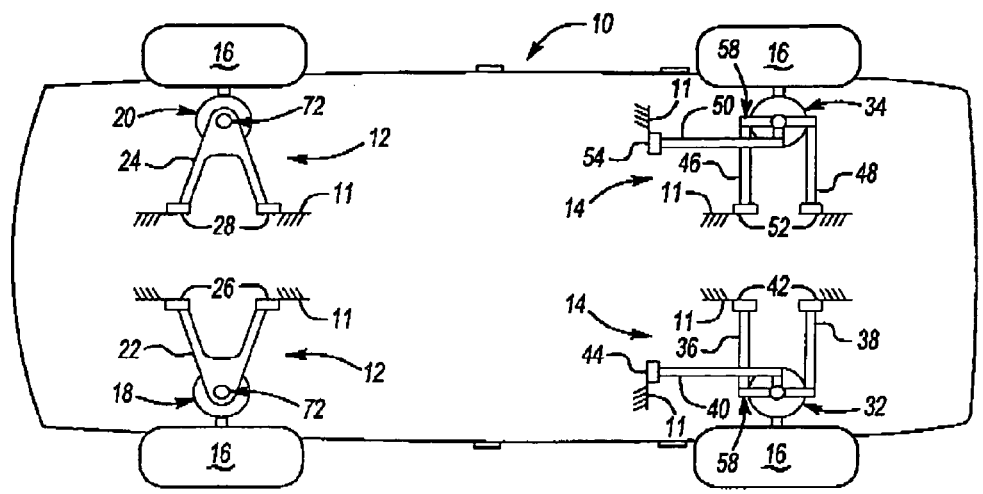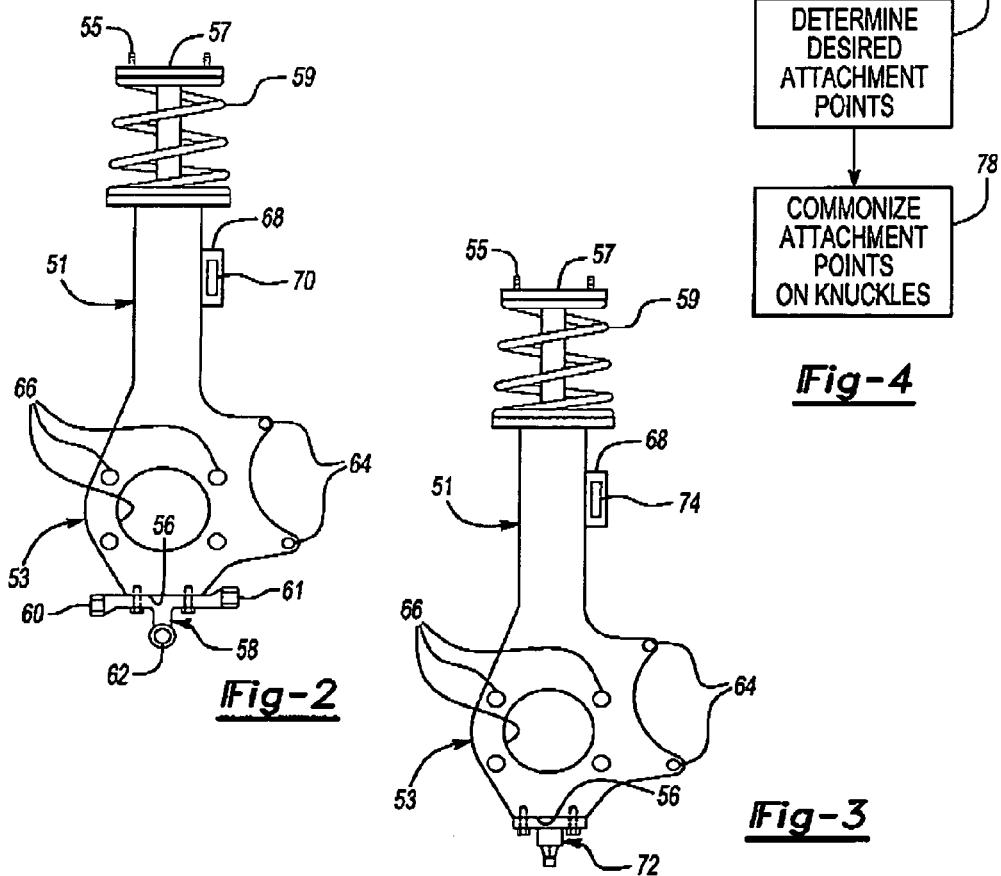

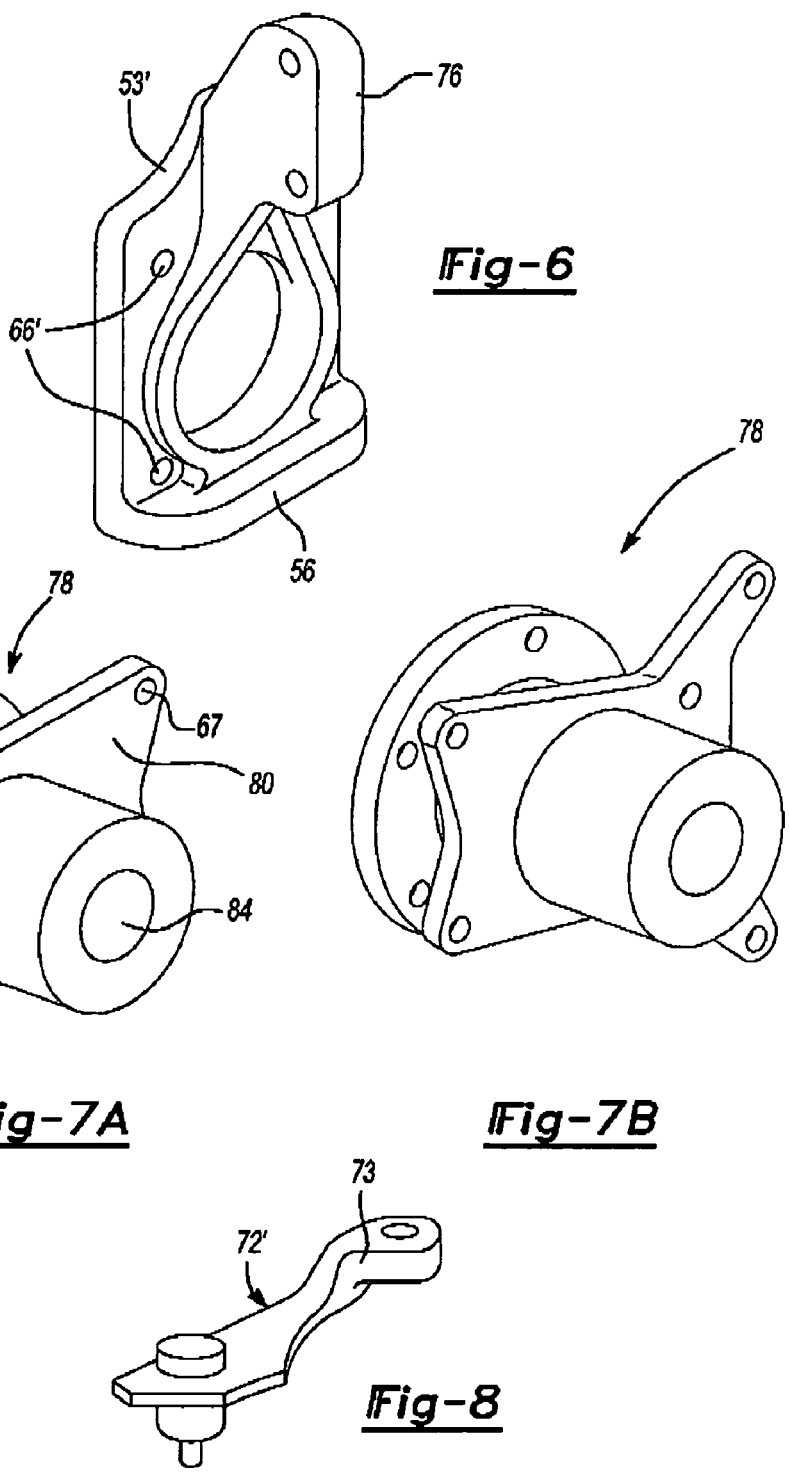

RECONFIGURABLE STRUT ASSEMBLY

This application is a continuation-in-part of U.S. patent application Ser. No. 10/349,726 filed Jan. 23, 2003 now U.S. Pat. No. 6,997,467.

BACKGROUND OF THE INVENTION

This invention relates to a suspension system for a passenger vehicle, and more particularly, the invention relates to a reconfigurable strut assembly including an integrated strut cylinder and knuckle for use on at least two and preferably all of the corners of a vehicle.

Vehicle suspension designs typically use four individual knuckles at each corner of a vehicle to allow for various lower suspension geometry. Specifically, the orientation and attachment of the brakes, steering components, struts relative to the vehicle body, and other features are particular to each corner of the vehicle such that a unique strut and knuckle is required at each corner of the vehicle. That is, the front and rear struts and knuckles are different, and the left and right struts and knuckles are different. Furthermore, the knuckle designs are often specific only to one vehicle line. The lack of interchangeability of struts and knuckles within a vehicle line and with other vehicles adds significant tooling costs to the suspension component. Therefore, what is needed is an interchangeable strut assembly that may be used on more than one corner of a vehicle and across vehicle lines.

SUMMARY OF THE INVENTION AND ADVANTAGES

The present invention provides a vehicle with front and rear suspension systems that share common knuckles and other components by developing common attachment points for the components typically attached to the knuckle.

The vehicle includes front left and right strut assemblies respectively including front left and right knuckles. Rear left and right strut assemblies respectively include rear left and right knuckles. The knuckles are common with one another with each knuckle having a common lower attachment boss. The front left and right knuckles respectively receive front left and right connection members at the lower attachment boss. The lower attachment boss is respectively interconnected to the front left and right suspension components. The rear left and right knuckles respectively receive rear left and right connection members at the lower attachment boss. The lower attachment boss is respectively interconnected to rear left and right suspension components.

The overall suspension for the vehicle is designed by determining the knuckle position parameters for one of the knuckles including such features as suspension member, brake, and wheel assembly attachment points. Similarly, the knuckle position parameters are determined for another knuckle in a different location or on a different vehicle. In this manner, left and right and/or front and rear knuckle position parameters may be determined. Common vehicle attachment points on the knuckles are then calculated for the vehicle. Several iterations of the above design process may occur to commonize the suspension for a particular vehicle or across particular vehicle lines.

The knuckle may be integrated with the strut cylinder or separately attached. Similarly, the brake attachment points may be integrated with the knuckle or provided by a separate plate that is secured to the knuckle.

Accordingly, the above invention provides an interchangeable strut assembly that may be used on more than one corner of a vehicle and across vehicle lines.

BRIEF DESCRIPTION OF THE DRAWINGS

Other advantages of the present invention can be understood by reference to the following detailed description when considered in connection with the accompanying drawings wherein:

FIG. 1 is a top elevational schematic view of a front and rear suspension system for a vehicle;

FIG. 2 is a side elevational view of a common rear strut assembly for the vehicle shown in FIG. 1;

FIG. 3 is a side elevational view of a front strut assembly for the vehicle shown in FIG. 1;

FIG. 4 is a block diagram of the present invention design process for designing and manufacturing interchangeable strut assemblies for a vehicle or between vehicle lines;

FIG. 6 is another example of the inventive interchangeable knuckle;

FIG. 7A is an inventive bearing hub assembly oriented for installation on one side of the vehicle;

FIG. 7B is the bearing hub assembly oriented for installation on the other side of the vehicle; and FIG. 8 is a perspective view of a connection member similar to that shown in FIG. 3.

DETAILED DESCRIPTION OF THE PREFERRED EMBODIMENT

Figure 5:
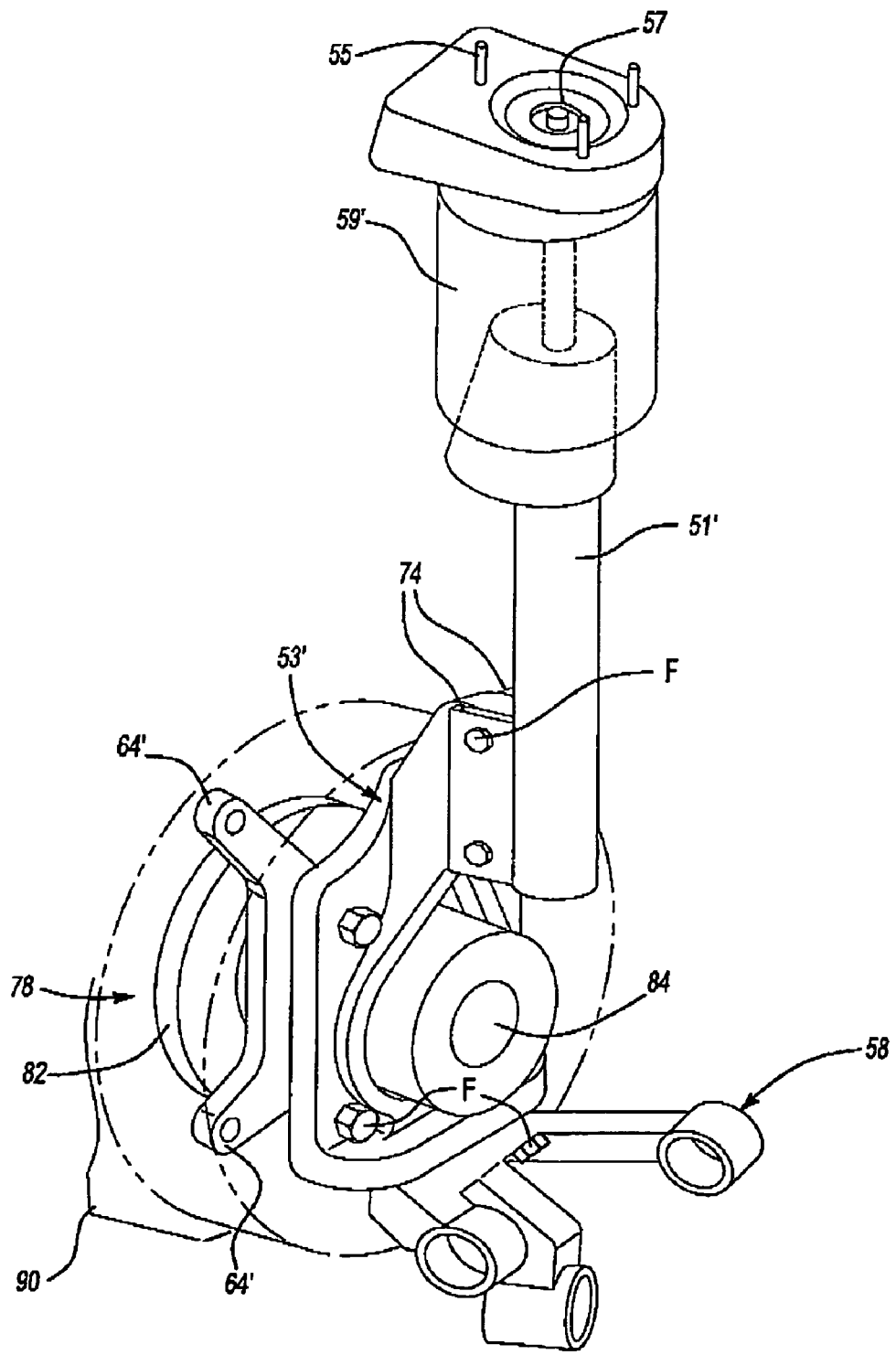
FIG. 5 is a perspective view of another example of the inventive strut assembly.

In one example, the present invention provides a single integrated strut and knuckle casting that can be used on different corners of a particular vehicle and even across vehicle lines by commonizing the basic structure of the strut-knuckle and various bolt-on attachments. The attachments provide for several lower geometry configurations providing the ability of the knuckle to be used on all four corners of the vehicle as well as across vehicle lines. Similarly, the upper configuration of the strut may be changed as desired.

A vehicle 10 is shown in FIG. 1. The vehicle 10 includes a front suspension 12 and a rear suspension system 14. The front suspension system 12 includes front left 18 and right 20 strut assemblies each supporting wheels 16. Although the suspension components for a particular vehicle may be different than shown, the depicted front suspension system utilizes a McPherson strut geometry. The front left strut assembly 18 includes a left lower control arm 22 connected to the vehicle frame 11 by left pivotal frame connections 26, as is known in the art. Similarly, the front right strut assembly 20 includes a right lower control arm 24 pivotally connected to the vehicle frame 11 by a right pivotal frame connection 28, as is known in the art. The strut assemblies 18 and 20 are connected between the vehicle frame 11 and attached to the lower control arms 22 and 24 typically by a ball joint, which is discussed in more detail below.

The rear suspension system 14 includes left rear 32 and right rear 34 strut assemblies. The rear suspension system 14 is of an independent trailing arm configuration. The left rear strut assembly 32 is connected to the vehicle frame 11 at the upper portion and is supported at the lower portion by a pair of spaced apart left lateral links 36 and 38. A longitudinal link 40 is connected between the lower portion of the strut assembly and the vehicle frame 11. The lateral 36, 38 and longitudinal 40 left links are pivotally supported on the vehicle frame 11 respectively by a pair of left lateral 42 and a forward 44 pivotal frame connections. Similarly, the right rear strut assembly 34 is supported by the vehicle frame 11 at an upper portion. The lower portion of the right rear strut assembly 34 is supported by a pair of spaced apart right lateral links 46 and 48. A longitudinal link 50 is interconnected between the lower portion of the strut assembly 34 and the vehicle frame 11. The right lateral links 46 and 48 and longitudinal link 50 are pivotally supported on the vehicle frame 11 respectively by a pair of right lateral 52 and a forward 54 pivotal frame connections.

The front suspension system 12 and rear suspension system 14 described above is merely illustrative of two suspension configurations to which the present invention may apply. That is, the reconfigurable strut assembly described in further detail below may be used for suspension configurations other than those described above or depicted in the figures.

A rear strut assembly is depicted in FIG. 2. The strut assembly includes an integrated strut cylinder 51 and knuckle 53. The integrated strut cylinder 51 and knuckle 53 may be manufactured of a single metal casting. The strut assembly includes an upper attachment point 57 that may include fasteners 55 for attaching the upper portion of the strut assembly to the vehicle frame 11. A spring 59 is shown arranged between the upper attachment point 57 and the cylinder 51, although an air bag may also be used (see FIG. 5).

The knuckle 53 includes a lower attachment boss 56 to which a connection member 58 may be attached using fastening elements. It is most desirable that the strut cylinder 51, knuckle 53, and lower attachment boss 56 be common for both sides of the rear strut assemblies, and preferably the strut assemblies for both the front and rear of the vehicle. Alternatively, these may be interchangeable between strut assemblies on only one side. The connection member 58 may provide a plurality of attachment points 60, 61 and 62 specific to the left or right side of the rear suspension system 14. For a strut assembly common to both the front and rear suspension system, a connection member may be provided for each side of the front suspension system, as will be discussed relative to FIG. 3 below.

With continuing reference to FIG. 2, the knuckle 53 includes a brake attachment feature 64 and wheel assembly attachment feature 66 that are common to both sides of the rear suspension system and preferably all four corners of the vehicle. In this manner, the strut cylinder 51 and knuckle 53 may be oriented differently for the front and rear and left and right side of the vehicle. The attachment features 64 and 66 and lower attachment boss 56 may be generally coplanar so that they may be rotated 180° from one side to the other.

The damping characteristics of the strut assembly may be tailored for the front or rear suspension of a vehicle or between vehicle lines by providing an external valve housing 68 extending from a portion of the strut cylinder 51. Depending upon the desired damping for the application, a particular valve assembly 70 may be installed within the external valve housing 68 to provide the desired damping characteristics for the application. In this manner, the reconfigurable strut assembly may be more specifically tailored for the desired application so that the flexibility using the common design of the present invention is not sacrificed.

Referring to FIG. 3, a front suspension strut assembly is shown. A different connection member 72, such as a ball joint may be secured to the lower attachment boss 56 to provide the particular attachment feature typically used for a McPherson strut configuration. The connection member may also include a steering arm 73 as shown at 72' in FIG. 8. A different valve assembly 74 may be installed in the external valve housing 68 to provide a damping characteristic for the front suspension that is different than the rear suspension. Components such as the upper attachment point 57 and the spring element 59 may also be varied (see FIG. 5).

The design process for the present invention reconfigurable strut assembly requires the consideration of various design features for the left and right sides and front and rear sides of a particular vehicle and potentially between or across vehicle lines. First, the desired attachment points such as brake attachment features, wheel assembly attachment features, and upper and lower attachment points must be determined. The vehicle attachment points must then be commonized by calculating the most desirable attachment points for the strut assemblies, as shown at block 78. It may be desirable to integrate components where possible while maintaining as much interchangeability and flexibility as desired. Several iterations of the design process depicted in FIG. 4 may be required to obtain the desired common strut assembly.

Another example of the inventive strut assembly is shown in FIG. 5, which is obtained using the inventive design process depicted in FIG. 4. In this example, the knuckle 53' and strut cylinder 51' are not integrated but bolted by fasteners F together using flanges 74 and member 76 received between the flanges 74, best shown in FIGS. 5 and 6. The spring 59 is arranged between the upper attachment point 57 and the cylinder 51'.

Referring to FIGS. 5, 7A and 7B, a bearing hub assembly 78 includes a plate 80 secured to the knuckle 53'. The plate 80 includes brake attachment features 64' supporting brake caliper 90. The plate 80 is secured to wheel assembly attachment features 66' using complementary attachment features 67. Specifically, the features 66' and 67 may be apertures receiving fasteners F securing the plate 80 to the knuckle 53'. The plate 80 includes bearings rotationally supporting a hub 82 for receiving a wheel. An inner diameter 84 of the hub is accessible to the inner side of the strut assembly and includes splines for drive applications in which a half-shaft is coupled to the hub 82. The bearing hub assembly 78 may be used on all four corners of the vehicle. Moreover, for non-drive axle applications, the spline features on the inner diameter need not be used.

The number and position of the attachment features and fasteners is determined by service and structural considerations. The attachment features may be threaded or unthreaded apertures, and the fasteners may be bolts or other suitable fastening elements.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension comprising a strut assembly including a knuckle secured to a strut cylinder by a first fastener, said knuckle having a lower attachment boss receiving a lower suspension member which is secured to said lower attachment boss by a second fastener, said knuckle including a bearing hub assembly attachment feature with a bearing hub assembly secured thereto by a third fastener, said bearing hub assembly rotatably supporting a wheel hub, wherein said strut assembly is a left strut assembly, and comprising a right strut assembly including common lower suspension members between said left and right strut assemblies.

2. The suspension according to claim 1, wherein said left and right strut assemblies include common bearing hub assemblies between said left and right strut assemblies.

3. The suspension according to claim 2, wherein the strut cylinders and knuckles are common between said left and right strut assemblies.

4. A suspension comprising a strut assembly including a knuckle secured to a strut cylinder by a first fastener, said knuckle having a lower attachment boss receiving a lower suspension member which is secured to said lower attachment boss by a second fastener, said knuckle including a beating hub assembly attachment feature with a bearing hub assembly secured thereto by a third fastener, said bearing hub assembly rotatably supporting a wheel hub, wherein said strut assembly is a front strut assembly, and comprising a rear strut assembly including common bearing hub assemblies between said front and rear strut assemblies.

5. The suspension according to claim 4, wherein said front and rear strut assemblies include common lower suspension members between said front and rear strut assemblies.

6. The suspension according to claim 5, wherein the strut cylinders and knuckles are common between said front and rear strut assemblies.

7. A suspension comprising a strut assembly including a knuckle secured to a strut cylinder by a first fastener, said knuckle having a lower attachment boss receiving a lower suspension member which is secured to said lower attachment boss by a second fastener, said knuckle including a bearing hub assembly attachment feature with a bearing hub assembly secured thereto by a third fastener, said bearing hub assembly rotatably supporting a wheel hub, wherein said strut assembly is a left strut assembly, and comprising a right strut assembly including common bearing hub assemblies between said left and right strut assemblies.

8. A suspension comprising a strut assembly including a knuckle secured to a strut cylinder by a first fastener, said knuckle having a lower attachment boss receiving a lower suspension member which is secured to said lower attachment boss by a second fastener, said knuckle including a bearing hub assembly attachment feature with a bearing hub assembly secured thereto by a third fastener, said bearing hub assembly rotatably supporting a wheel hub, wherein said strut assembly is a front strut assembly, and comprising a rear strut assembly including common lower suspension members between said front and rear strut assemblies.

* * * * *

UNITED STATES PATENT AND TRADEMARK OFFICE
CERTIFICATE OF CORRECTION

PATENT NO. : 7,140,625 B2
APPLICATION NO. : 10/680685
DATED : November 28, 2006
INVENTOR(S) : Simon Dean Page 1 of 1

It is certified that error appears in the above-identified patent and that said Letters Patent is hereby corrected as shown below:

Claim 4, Column 5, line 17: "beating" should be --bearing--

Signed and Sealed this

Thirteenth Day of March, 2007

JON W. DUDAS
*Director of the United States Patent and Trademark Office*